(12) United States Patent
Short et al.

(10) Patent No.: US 12,335,370 B2
(45) Date of Patent: Jun. 17, 2025

(54) DEVICES, SYSTEMS, AND METHODS FOR SUMMARIZING ANALYTIC OBSERVATIONS

(71) Applicant: BlueVoyant LLC, New York, NY (US)

(72) Inventors: Reagan Short, New York, NY (US); Steven Bremner, New York, NY (US); Christopher Wildes, New York, NY (US)

(73) Assignee: BlueVoyant LLC, New York, NY (US)

( * ) Notice: Subject to any disclaimer, the term of this patent is extended or adjusted under 35 U.S.C. 154(b) by 0 days.

(21) Appl. No.: 18/847,840

(22) PCT Filed: May 10, 2023

(86) PCT No.: PCT/US2023/021736
§ 371 (c)(1),
(2) Date: Sep. 17, 2024

(87) PCT Pub. No.: WO2023/220178
PCT Pub. Date: Nov. 16, 2023

(65) Prior Publication Data
US 2025/0112762 A1 Apr. 3, 2025

Related U.S. Application Data

(60) Provisional application No. 63/341,264, filed on May 12, 2022.

(51) Int. Cl.
*H04L 9/06* (2006.01)
(52) U.S. Cl.
CPC .................................. *H04L 9/0643* (2013.01)
(58) Field of Classification Search
CPC .................................................. H04L 9/0643
See application file for complete search history.

(56) References Cited

U.S. PATENT DOCUMENTS

| | | | |
|---|---|---|---|
| 2016/0188591 A1* | 6/2016 | Bestler | H04L 63/0853 707/744 |
| 2019/0006822 A1* | 1/2019 | Luoma | H02B 1/26 |
| 2021/0216630 A1* | 7/2021 | Karr | H04L 63/1416 |
| 2021/0374253 A1* | 12/2021 | Chen | H04L 9/0897 |
| 2021/0377016 A1* | 12/2021 | Perlman | H04L 9/0891 |
| 2022/0045850 A1* | 2/2022 | Ejiri | G06F 13/1668 |
| 2022/0103338 A1* | 3/2022 | Brooker | G06F 21/6218 |

FOREIGN PATENT DOCUMENTS

WO 2023220178 A1 11/2023

OTHER PUBLICATIONS

International Search Report and Written Opinion for corresponding International Application No. PCT/US2023/021736, mailed Aug. 16, 2023.

* cited by examiner

*Primary Examiner* — Taghi T Arani
*Assistant Examiner* — Blake I Narramore
(74) *Attorney, Agent, or Firm* — K&L Gates LLP

(57) ABSTRACT

A method for generating representative Key:Value pairs of cyber event or cyber asset behavior and de-duplicating multiple alerts associated with a cyber event or cyber asset behavior. The Key:Value pairs comprise a hash value representative of the cyber event or cyber asset behavior and an asset identifier. The Key:Value pairs provides a security operations center a queryable identifier to easily track the behavior of an asset and determine the number of cyber event observations in a predetermined time period.

20 Claims, 7 Drawing Sheets

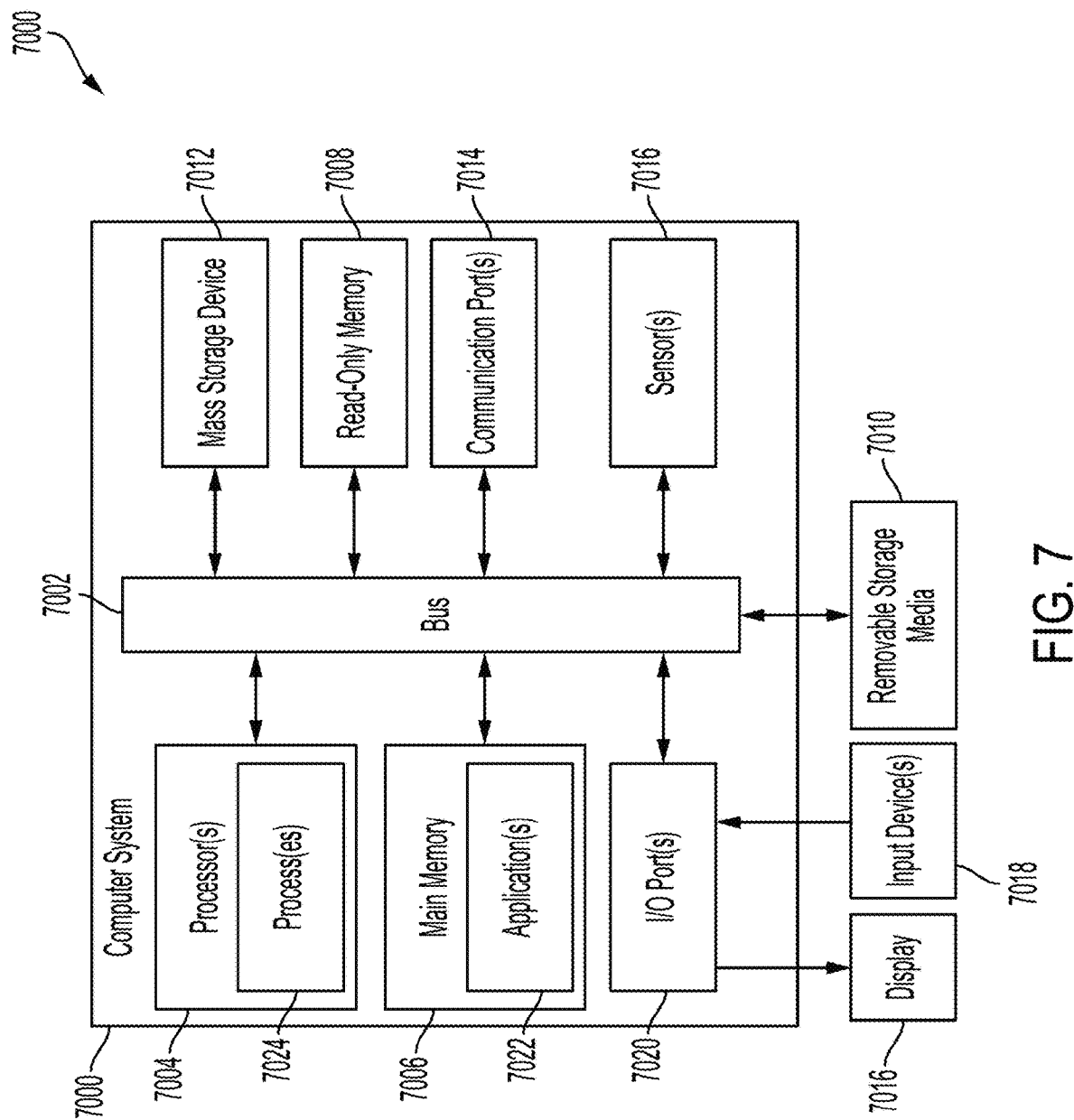

DEVICES, SYSTEMS, AND METHODS FOR SUMMARIZING ANALYTIC OBSERVATIONS

CROSS-REFERENCE TO RELATED APPLICATIONS

This application is a U.S. National Stage Entry under 35 U.S.C. § 371 of International Patent Application No. PCT/US2023/021736, entitled DEVICES, SYSTEMS, AND METHODS FOR SUMMARIZING ANALYTIC OBSERVATIONS, filed May 10, 2023, which claims priority to U.S. Provisional Patent Application No. 63/341,264, titled DEVICES, SYSTEMS, AND METHODS FOR SUMMARIZING ANALYTIC OBSERVATIONS, filed May 12, 2022, the disclosures of which are hereby incorporated by reference in their entirety.

TECHNICAL FIELD

The present disclosure is generally related to network security, and, more particularly, is directed to improved devices, systems, and methods for generating representative Key:Value pairs of cyber event or cyber asset behavior and deduplication of multiple alerts associated with a cyber event or cyber asset behavior. The Key:Value pairs comprise a hash value that represents a cyber event or cyber asset behavior, and an asset identifier. The Key:Value pairs provide a security operations center with a queryable identifier to easily track the behavior of an asset.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In one aspect, the present disclosure describes a method for deduplication of security case alerts based on the identification of Key:Value pair for behavioral observation data and asset identifies, the method comprising: receiving, by a processor, a dataset comprising behavioral observation data from one or more data source; executing, by the processor, a query comprising security detection saved searches, wherein the query searches the dataset of behavioral observation data for data entries that match one or more of the security detection saved searches; generating, by the processor, search results from the dataset, wherein the search results comprise matching dataset entries to the security detection saved searches, wherein each matching entry of the search results is generated as a row with a plurality of fields, and wherein the plurality of fields include at least an asset identifier; determining, by the processor, one or more dynamic fields for each security detection saved search based on the query results for the respective security detection saved search; excluding, by the processor, the one or more dynamic fields from the query; concatenating, by the processor, a search string that includes all non-excluded fields; generating, by the processor, a hash value for the concatenated search string; generating, by the processor, a first Key:Value pair with the first generated hash value that summarizes the asset behavior and the asset identifier; determining, by the processor, a predetermined throttling interval for the Key:Value Pair, wherein the throttling interval indicates the amount of time between a security case alert for the first key value pair; emitting, by the processor, a first security case alert for the first Key:Value pair and initiate a counter for the first Key:Value pair, wherein the first security case alert is the first security case emitted in the throttling interval; detecting, by the processor, a second query result matching the first Key:Value pair; determining, by the processor, that the counter is less than the throttling interval; suppressing, by the processor, a subsequent security case alert for the second query result matching the first Key:Value pair during the predetermined throttling interval; updating, by the processor, a throttling log associated with each Key:Value pair to include the total number of detected matching Key:Value pair in the throttling interval.

In another aspect, the present disclosure describes a system for generating unique hash values representative of queryable threat event, the system comprising: a security analytics server comprising: at least one processor; at least one memory communicatively coupled to the at least one processor; an input/output interface configured for accessing data from one or more external source, each of the plurality of external sources communicatively coupled to the at least one processor; a database residing in the at least one memory and configured to store the data; and wherein the at least one memory is configured to store instructions executable by the at least one processor to: receive a dataset comprising behavioral observation data from one or more data source; execute a query comprising security detection saved searches, wherein the query searches the dataset of behavioral observation data for data entries that match one or more of the security detection saved searches; generate search results from the dataset, wherein the search results comprise matching dataset entries to the security detection saved searches, wherein each matching entry of the search results is generated as a row with a plurality of fields, and wherein the plurality of fields include at least an asset identifier; determine one or more dynamic fields for each security detection saved search based on the query results for the respective security detection saved search; exclude the one or more dynamic fields from the query; concatenate a search string that includes all non-excluded fields; generate a hash value for the concatenated search string; generate a first Key:Value pair with the first generated hash value that summarizes the asset behavior and the asset identifier; determine a predetermined throttling interval for the Key:Value Pair, wherein the throttling interval indicates the amount of time between a security case alert for the first key value pair; emit a first security case alert for the first Key:Value pair and initiate a counter for the first Key:Value pair, wherein the first security case alert is the first security case emitted in the throttling interval; detect a second query result matching the first Key:Value pair; determine that the counter is less than the throttling interval; suppress a subsequent security case alert for the second query result matching the first Key:Value pair during the predetermined throttling interval; update a throttling log associated with each Key:Value pair to include the total number of detected matching Key:Value pair in the throttling interval.

BRIEF DESCRIPTION OF THE DRAWINGS

FIG. 7 illustrates a diagram of a computing system, in accordance with at least one aspect of the present disclosure.

Figure 1:
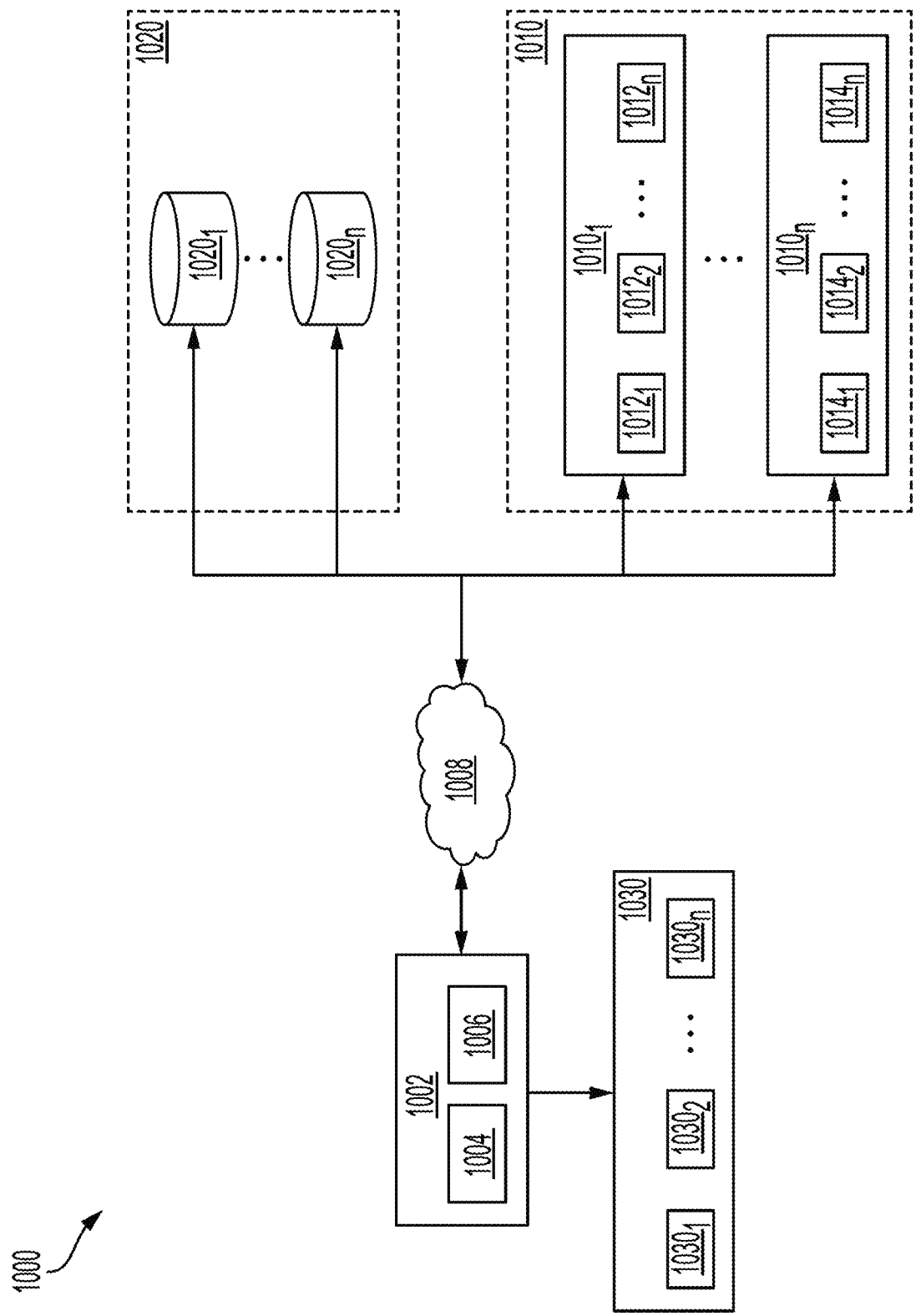
FIG. 1 illustrates a system configured for Security Information and Event Management (SIEM) implementation across multiple tenants, in accordance with at least one aspect of the present disclosure.

Corresponding reference characters indicate corresponding parts throughout the several views. The exemplifications set out herein illustrate various aspects of the present disclosure, in one form, and such exemplifications are not to be construed as limiting the scope of the present disclosure in any manner.

DETAILED DESCRIPTION

The Applicant of the present application owns the following U.S. Provisional Patent Applications, the disclosure of each of which is herein incorporated by reference in its entirety:

U.S. Provisional Patent Application No. 63/344,305 titled DEVICES, SYSTEMS, AND METHODS FOR INGESTING & ENRICHING SECURITY INFORMATION TO AUTONOMOUSLY SECURE A PLURALITY OF TENANT NETWORKS, filed on May 20, 202;

U.S. Provisional Patent Application No. 63/345,679 titled DEVICES, SYSTEMS, AND METHODS FOR IDENTIFYING CYBER ASSETS AND GENERATING CYBER RISK MITIGATION ACTIONS BASED ON A DEMOCRATIC MATCHING ALGORITHM, filed on May 25, 2022

International Patent Application No. PCT/US2022/072739, titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS, filed on Jun. 3, 2022;

International Patent Application No. PCT/US2022/072743, titled DEVICES, SYSTEMS, AND METHODS FOR STANDARDIZING & STREAMLINING THE DEPLOYMENT OF SECURITY INFORMATION & EVENT MANAGEMENT ARTIFACTS FOR MULTIPLE TENANTS, filed on Jun. 3, 2022;

U.S. Provisional Patent Application No. 63/365,819 titled DEVICES, METHODS, AND SYSTEMS FOR GENERATING A HIGHLY-SCALABLE, EFFICIENT COMPOSITE RECORD INDEX, filed on Jun. 3, 2022

U.S. Provisional Patent Application No. 63/353,992 titled DEVICES, SYSTEMS, AND METHODS FOR CATEGORIZING, PRIORITIZING, AND MITIGATING CYBER SECURITY RISKS, filed on Jun. 21, 2022;

U.S. Provisional Patent Application No. 63/366,903 titled DEVICES, SYSTEMS, AND METHOD FOR GENERATING AND USING A QUERYABLE INDEX IN A CYBER DATA MODEL TO ENHANCE NETWORK SECURITY, filed on Jun. 23, 2022;

U.S. Provisional Patent Application No. 63/368,567 titled DEVICES, SYSTEMS, AND METHODS FOR UTILIZING A NETWORKED, COMPUTER-ASSISTED, THREAT HUNTING PLATFORM TO ENHANCE NETWORK SECURITY, filed on Jul. 15, 2022;

U.S. Provisional Patent Application No. 63/369,582 titled AUTONOMOUS THREAT SCORING AND SECURITY ENHANCEMENT, filed on Jul. 27, 2022;

U.S. Provisional Patent Application No. 63/377,304, titled DEVICES, SYSTEMS, AND METHODS FOR CONTINUOUSLY ENHANCING THE IMPLEMENTATION OF CODE CHANGES VIA ENRICHED PIPELINES, filed on Sep. 27, 2022;

International Patent Application No. PCT/US2022/082167 titled DEVICES, SYSTEMS, AND METHODS FOR PROVISIONING AND UPDATING SECURITY INFORMATION & EVENT MANAGEMENT ARTIFACTS FOR MULTIPLE TENANTS, filed on Dec. 21, 2022;

International Patent Application No. PCT/US2022/082173 titled DEVICES, SYSTEMS, AND METHODS FOR STREAMLINING AND STANDARDIZING THE INGEST OF SECURITY DATA ACROSS MULTIPLE TENANTS, filed on Dec. 21, 2022;

International Patent Application No. PCT/US2023/061069 titled DEVICES, SYSTEMS, AND METHODS FOR REMOTELY MANAGING ANOTHER ORGANIZATION'S SECURITY ORCHESTRATION, AUTOMATION, AND RESPONSE, filed on Jan. 23, 2023;

International Patent Application No. PCT/US2023/062894, titled DEVICES, SYSTEMS, AND METHODS FOR IDENTIFYING CYBER ASSETS AND GENERATING CYBER RISK MITIGATION ACTION BASED ON DOMAIN REDIRECTS, filed on Feb. 20, 2023;

Numerous specific details are set forth to provide a thorough understanding of the overall structure, function, manufacture, and use of the aspects as described in the disclosure, and illustrated in the accompanying drawings. Well-known operations, components, and elements have not been described in detail so as not to obscure the aspects described in the specification. The reader will understand that the aspects described, and illustrated herein are non-limiting aspects, and thus it can be appreciated that the specific structural, and functional details disclosed herein may be representative, and illustrative. Variations, and changes thereto may be made without departing from the scope of the claims.

Before explaining various aspects of the systems, and methods disclosed herein in detail, it should be noted that the illustrative aspects are not limited in application or use to the details of disclosed in the accompanying drawings, and description. It shall be appreciated that the illustrative aspects may be implemented or incorporated in other aspects, variations, and modifications, and may be practiced or carried out in various ways. Further, unless otherwise indicated, the terms, and expressions employed herein have been chosen for the purpose of describing the illustrative aspects for the convenience of the reader, and are not for the purpose of limitation thereof. For example, it shall be appreciated that any reference to a specific manufacturer, software suite, application, or development platform disclosed herein is merely intended to illustrate several of the many aspects of the present disclosure. This includes any, and all references to trademarks. Accordingly, it shall be appreciated that the devices, systems, and methods disclosed herein can be implemented to enhance any software update, in accordance with any intended use, and/or user preference.

As used herein, the term "server" may refer to or include one or more computing devices that are operated by or facilitate communication, and processing for multiple parties in a network environment, such as the Internet or any public or private network. Reference to "a server" or "a processor," as used herein, may refer to a previously-recited server, and/or processor that are recited as performing a previous step or function, a different server, and/or processor, and/or a combination of servers, and/or processors.

As used herein, the term "network" may refer to or include an entire enterprise information technology ("IT") system, as deployed by a tenant. For example, a network can include a group of two or more nodes (e.g., assets) connected by any physical and/or wireless connection and configured to communicate and share information with the other node or nodes. However, the term network shall not be limited to any particular nodes or any particular means of connecting those nodes. A network can include any combination of assets (e.g., devices, servers, desktop computers, laptop computers, personal digital assistants, mobile phones, wearables, smart appliances, etc.) configured to connect to an Ethernet, intranet, and/or extranet and communicate with one another via an ad hoc connection (e.g., Bluetooth®, near field communication ("NFC"), etc.), a local area connection ("LAN"), a wireless local area network ("WLAN"), and/or a virtual private network ("VPN"), regardless of each devices' physical location. A network can further include any tools, applications, and/or services deployed by devices, or otherwise utilized by an enterprise IT system, such as a firewall, an email client, document management systems, office systems, etc. In some non-limiting aspects, a "network" can include third-party devices, applications, and/or services that, although they are owned and controlled by a third party, are authorized by the tenant to access the enterprise IT system.

As used herein, the term "platform" can include software architectures, hardware architectures, and/or combinations thereof. A platform can include either a stand-alone software product, a network architecture, and/or a software product configured to integrate within a software architecture and/or a hardware architecture, as required for the software product to provide its technological benefit. For example, a platform can include any combination of a chipset, a processor, a logic-based device, a memory, a storage, a graphical user interface, a graphics subsystem, an application, and/or a communication module (e.g., a transceiver). In other words, a platform can provide the resources required to enable the technological benefits provided by software. According to some non-limiting aspects, the technological benefit provided by the software is provided to the physical resources of the ecosystem or other software employed by physical resources within the ecosystem (e.g., APIs, services, etc.). According to other non-limiting aspects, a platform can include a framework of several software applications intended and designed to work together.

As used herein, the term "Security Monitoring Platform" may refer to or include software configured to aggregate and analyze activity from many different resources across an entire information technology (IT) infrastructure. For example, a Security Monitoring Platform can include a Security Information and Event Management (SIEM) platform and/or other types of platforms used to monitor and/or analyze data (e.g., Splunk Enterprise Security, Microsoft Sentinel, Datadog Security Monitoring, ELK, etc.). The various aspects of the devices, systems, and methods disclosed herein as they relate to SIEM can similarly apply to any type of Security Monitoring Platform.

SIEM can be implemented to aggregate data (e.g., log data, event data, threat intelligence data, etc.) from multiple platforms, and analyze that data to catch abnormal behavior or potential cyberattacks. SIEM may collect security data from network devices, servers, domain controllers, and more. SIEM can be implemented to store, normalize, aggregate, and apply analytics to that data to discover trends, detect threats, and enable organizations to investigate any alerts. Although known SIEM tools (also referred to herein as SIEM detection engines) offer impressive functionality, including the ability to monitor events, collect data, and issue security alerts across a network, such tools are typically tailored for an implementing organization, and—more specifically—a particular network architecture, which can oftentimes be complex.

FIG. 1 illustrates a system 1000 configured for Security Information and Event Management (SIEM) implementation across multiple tenants is illustrated, in accordance with at least one non-limiting aspect of the present disclosure. The system 1000 can include a SIEM security analytics server 1002 comprising a memory 1004 and a processor 1006. In various aspects, SIEM security analytics server 1002 can comprise the computer system 7000 and the various components thereof (e.g., processor 1006 can be similar to processor(s) 7004, memory 1004 can be similar to main memory 7006, etc.), as will be discussed in further reference to FIG. 7.

In various aspects, the memory 1004 may be configured to store instructions that, when executed by processor 1006, generates a request for data from a plurality of data sources. The security analytics server 1002 may be configured to receive or request data from the plurality of data sources. The plurality of data sources comprises third-party data sources 1020 and network entities 1010. The third-party data sources 1020 are configured to monitor and record global internet traffic and store the data to local repositories 1022. The network entities 1010 comprise a plurality of cyber assets 1012, 1014 and provide data to the security analytics server 1002 associated with each cyber asset 1012, 1014. The data may comprise security observations, software versions, firmware versions, behavioral data, or other security data that are record over predetermined intervals and transmitted to the security analytics server 1002 for processing. The security analytics server 1002 may correlate various security observations to a cyber asset. In one aspect, the security analytics server 1002 may flag behavioral data as correlating to a predetermine security risk according to a behavioral model. The security analytics server 1002 may transmit the data to a specific analyst 1030 or randomly shuffle the data to the next available analyst 1030.

In one aspect, a security analytics server 1002 receives behavioral observation data from a plurality of data sources including third parties 1020 and network entities 1010. The behavioral observation data comprises an asset identifier paired with associated behavioral observations such as the time that the asset has accessed by a system, resource, or domain. The asset identifier may comprise a source IP address, destination IP address, or network domain. The sever aggregates the behavioral observation data, from the plurality of data sources, into a dataset where the observation data is processed to evaluate security vulnerabilities, risk, security event, likelihood for attack, etc. The server processes the behavioral observation data by running a query that compares the behavioral observation data to a plurality of security detection saved searches. Each security detection saved search comprises a behavior profile that correlates a potential security risk to an asset or malicious behavior of an asset. In one aspect, the security detection saved searches may be continuously updated or updated at a predetermined interval to ensure that the behavioral profiles are up-to-date.

Based on the behavioral profiles, the system may identify a behavior observation that correlates to a suspect file on a tenant's network or one of the tenant's assets. The suspect file may contain malicious content such as malware, ransomware, or other content indicative of a cyberattack. In one aspect, the system has administrator permissions that allow it to remotely delete the suspect file from one or more storage locations on the tenant's network. In another aspect, the system directly communicates with a tenant security administrator that locally manages the tenant's network. Upon detection of the suspect file, the system automatically generates an alert (e.g. email, text, phone call) to the security administrator. The alert may comprise an identification of the malicious content on the suspect file, the storage location of the suspect file, and the required action or intervention to remediate the threat associated with the suspect file.

In another aspect, behavioral observations may be classified in a queryable table and sent to an analyst for further evaluation. Upon matching the behavioral observation data to a security detection saved search, the system returns query results in a RowKey format. Each row in the RowKey format comprises a plurality of fields associated with the asset identifier. The system evaluates each field, corresponding to the individual security detection saved search, to determine which fields are dynamic and non-dynamic. The system selects only the non-dynamic fields from the RowKey and generates a concatenated string value. The system uses the concatenate string as the input to generate a hash value that summarizes the asset's observed behavior and matches a security detection saved search. The hash value is generated with a hashing algorithm such as SHA1, SHA256, or MD5.

The dynamic field values are not desirable to generate a representative identifier for the cyber behavior data because observation data with dynamic field values would create unique hashes and would not capture multiple occurrences of the same behavior. Dynamic fields, such as timestamps, vendor unique identifiers, and processor-generated metadata, are excluded from the hash value generation process to ensure that the hash value is not unique and can be used to identify historical or future occurrences of the same behavior. Once the system generates a hash value, the system creates a Key:Value pair, where the key may be "dedup_hash" and the value may be a hash value associated with an observation. Upon matching the Key:Value pair to a security detection saved search, the system generates a security case associated with the Key:Value pair and emits the security case to an available analyst to perform post-triage analysis.

In various aspects, three types of dynamic fields are typically identified in the RowKey table and are excluded from the hash value. These dynamic fields include: use-based fields (e.g. timestamp, start time/end time, session duration), vender introduced artifacts (e.g. vendor unique identifiers), and dynamic fields introduced by the query itself (e.g. processor-generated metadata). Examples of dynamic fields may include: observation counts (the number of observation events gathered by source detection), alertURL (the vendors creates a new alertURL for each iteration of the detected activity), observation description (text likely to include timestamps of an observation), duration (the timespan between discrete events, but likely to change on subsequent activity), internally-appended metadata (metadata created by a vendor like Splunk with server information, statistical artifacts added by search components like ufence, score, max/min, and processing artifacts added by search components like WhiteList, earliest/latest, search_id, and result_id). In comparison, examples of non-dynamic fields include: destination IP Address, source IP Address, file name, file path, hash_md5, hash_sha1, hash_sha256, http_user_agent, process_command_line, process_path, signature, signature id, user, source user, and target user.

The network security computing system further comprises a throttling system that determines a predetermined throttling interval for each security detection saved search. The throttling system emits a first security case, associated with a Key:Value pair, and initiates a throttling interval counter that measures the duration since the first security case was emitted. During the throttling interval, subsequent security cases that are associated with the same Key:Value pair are suppressed. Anecdotal evidence has shown that case suppression decreases the total number of security cases emitted by roughly 50 percent. The throttling system may calculate this based on a log of the total number of behavioral observation associated with the Key:Value pair in a given throttling interval and the number of de-duplicated hash values. Prior to emitting a security case, the throttling system determines whether a throttling interval is active for Key:Value pair. If a throttling interval is not active, a new security case is emitted. Additionally, once the throttling interval counter equals zero (count down) or the throttling interval (count up), the new security case is emitted for the same Key:Value pair.

Figure 2:
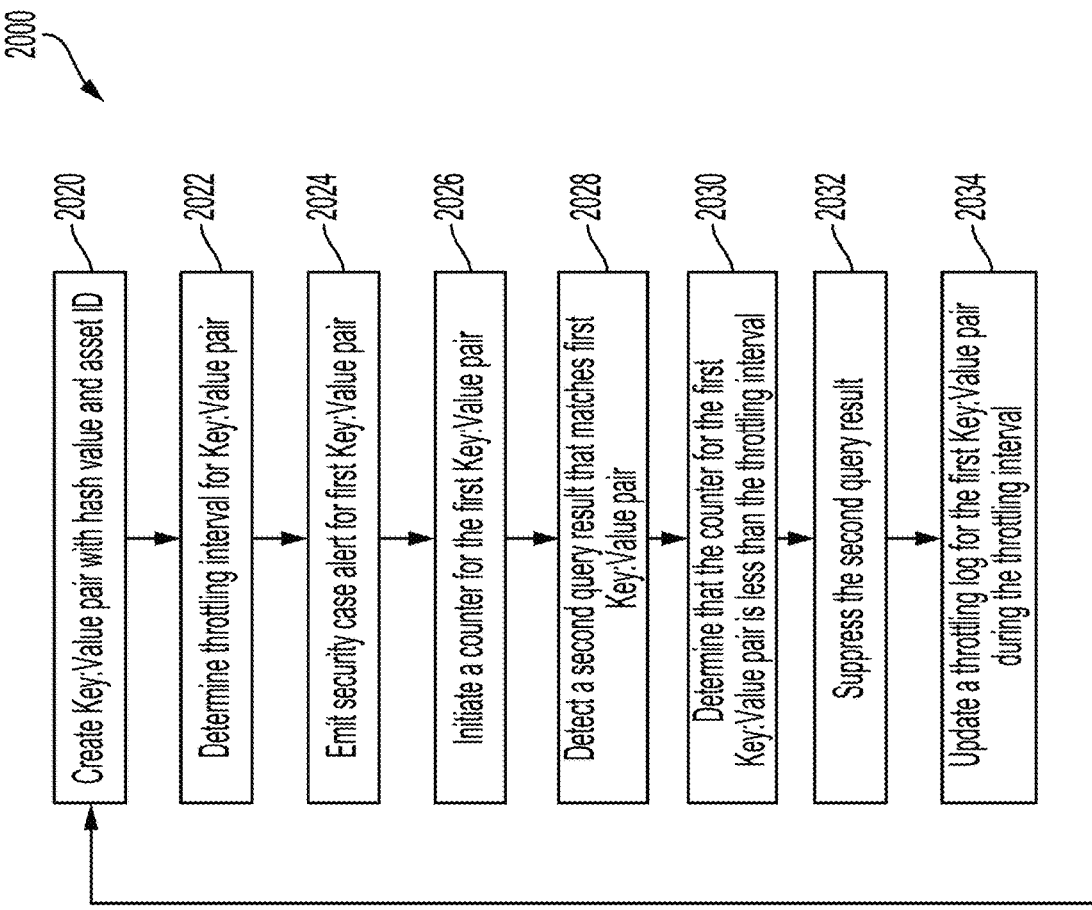
FIG. 2 illustrates a flow diagram of a method for generating a unique behavioral identifier corresponding to behavioral data, and de-duplicating behavioral security cases, emitted to analysts for further evaluation of the behavioral data, in accordance with at least one aspect of the present disclosure.
Figure 2:
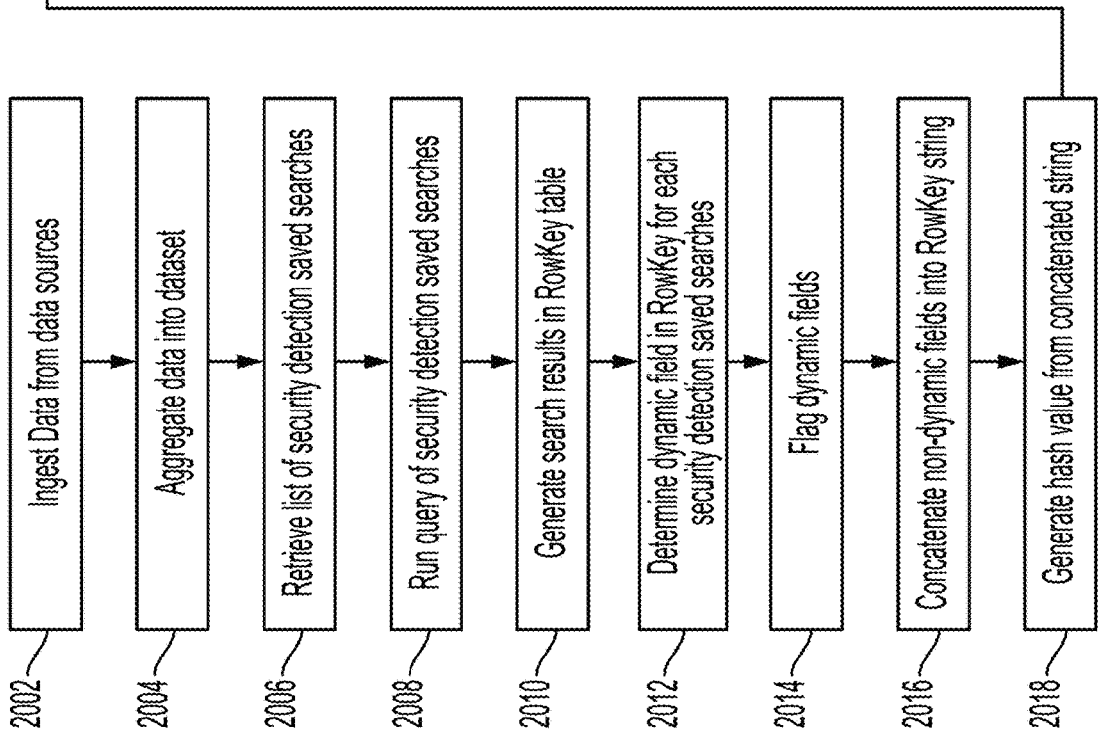

FIG. 2 shows a flow diagram of a method 2000 for generating a unique behavioral identifier corresponding to cyber behavioral data, and de-duplicating behavioral security cases, prior to cases being sent to an analyst for further evaluation. The security analytics server 1002 ingests 2002 data from a plurality of data sources including the third parties 1020 and the network entities 1010, and aggregates 2004 the data into a single dataset. The security analytics server 1002 retrieves 2006 a list of security detection saved searches from an external source or local repository, and queries 2008 the aggregated dataset with the security detection saved searches. The security analytics server generates 2006 a RowKey table with matching query results to the security detection saved searches, where each RowKey represent a matching result. The security analytics server 1002 evaluates each RowKey to determine dynamic and non-dynamic fields, and flags the dynamic fields 2014. The security analytics server 1002 generates a concatenated string for each RowKey based on the non-dynamic fields. The concatenated string is used to generate 2018 a hash value that represents the cyber event behavior. The security analytics server 1002 creates 2020 a Key:Value pair comprising the hash value that corresponds with an asset ID and a cyber event observation. The security analytics server determines 2022 a throttling interval for each Key:Value pair, and emits 2024 one security case alert per throttling interval. The security analytics server 1002 initiates 2026 a first throttling interval counter that is used to monitor the duration of the throttling interval. The security analytics server determines 2026 that a second Key:Value pair matches the first Key:Value pair and that the first throttling interval is still active 2030. Based on this determination 2026, the security analytics server 1002 suppresses 2032 a security case alert for the second Key:Value pair. Upon suppression of the security case alert, the security analytics server updates a throttling log for the Key:Value pair.

Refining a Hash Value Based on the Anticipated Number of Occurrence for an Associated Behavior In various aspects, that system may evaluate the accuracy of the behavioral summary identifier (hash value) by comparing an anticipated number of occurrences to a measured number of occurrences identified in a throttling interval. The anticipated number of occurrences may be highly variable and estimated according to each security detection saved search. In one aspect, the anticipated number of occurrences is estimated according to security event type, the relative age of security exploitation, or an average amount of network traffic, etc.

Once the system determines an anticipated number of occurrences for a detected behavior, the system may then generate an upper and lower threshold for the anticipated number of occurrences. In one aspect, the system may calculate the upper and lower thresholds based on the standard deviation and/or variance of the anticipated number of occurrences. The upper and lower thresholds may be used to automatically verify that the generated hash value for the observed behavior is within an anticipated range.

In one aspect, the system compares the observed number of occurrence to the upper and lower thresholds of the anticipated number of occurrences. When the observed number of occurrences is below a lower threshold, the system may determine that the hash value was generated with dynamic fields resulting in unique hash values. When the observed number of occurrences exceeds an upper threshold, the system may determine that the hash value was generated with not enough fields, and thus is too broad and ensnares too many different behavioral observations. The fields used to generate the hash values may be automatically updated to conform to a predetermined acceptable range for the anticipated number of occurrences, by adding, removing, or replacing a field.

The system may tune the hash values by creating a hierarchy of RowKey fields. The system may classify the RowKey fields in a hierarchy, ranging from dynamic fields to static or non-dynamic fields. The system may evaluate each field by comparing the field to the same field in a different rows to determine a likelihood of variability, and generate a hierarchy of fields for each security detection saved search. The hierarchy may classify each field along a continuous spectrum according to the degree of change to a field are over time. For example, the system may classify a timestamp field as the most dynamic field and the asset identifier as the least dynamic field.

Figure 3:
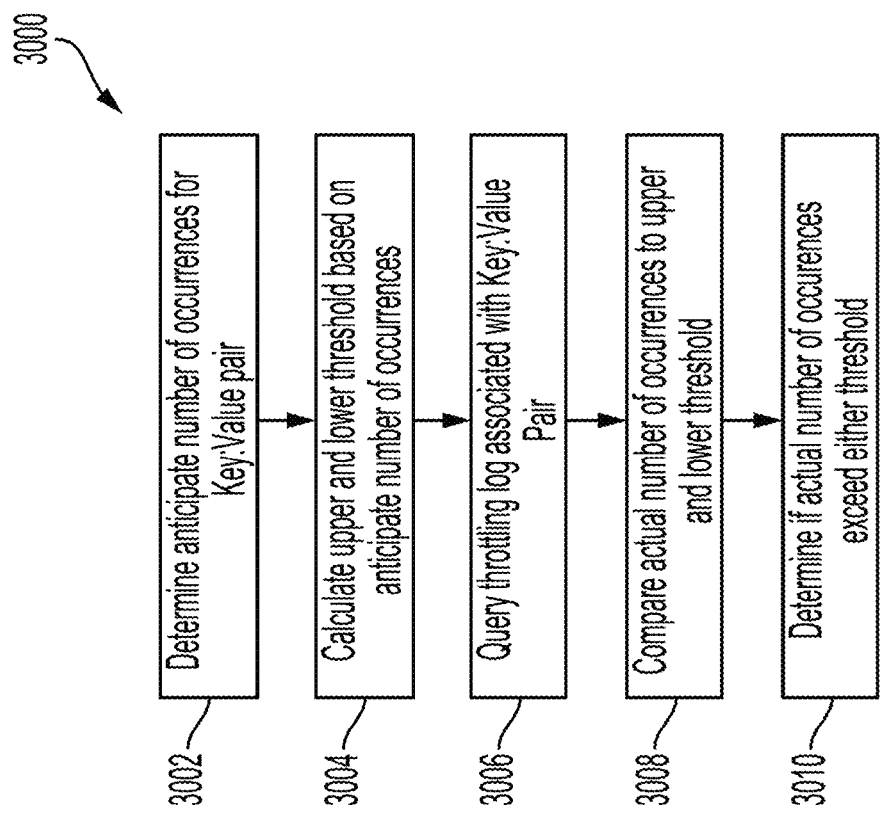
FIG. 3 shows a flow diagram for evaluating an observed number of occurrence of a Key:Value pair correlated to a cyber-event or behavior, in accordance with at least one aspect of the present disclosure.

FIG. 3 shows a flow diagram for evaluating an observed number of occurrence of a Key:Value pair correlated to a cyber-event or behavior, based on an anticipated number of occurrences for the cyber-event or behavior. The security analytics server determines 3002 an anticipated number of occurrences for a detected behavior, associated with a Key:Value pair. The server calculates 3004 an upper and lower threshold based on the anticipated number of occurrences. The server queries 3006 a throttling log associated with a first Key:Value pair to determine the total number of observations identified in one or more throttling intervals. The server compares 3008 the total number of observations to the upper and lower threshold. The server determines 3010 whether the total number of observations is below the lower threshold or exceeds the upper threshold.

Figure 4:
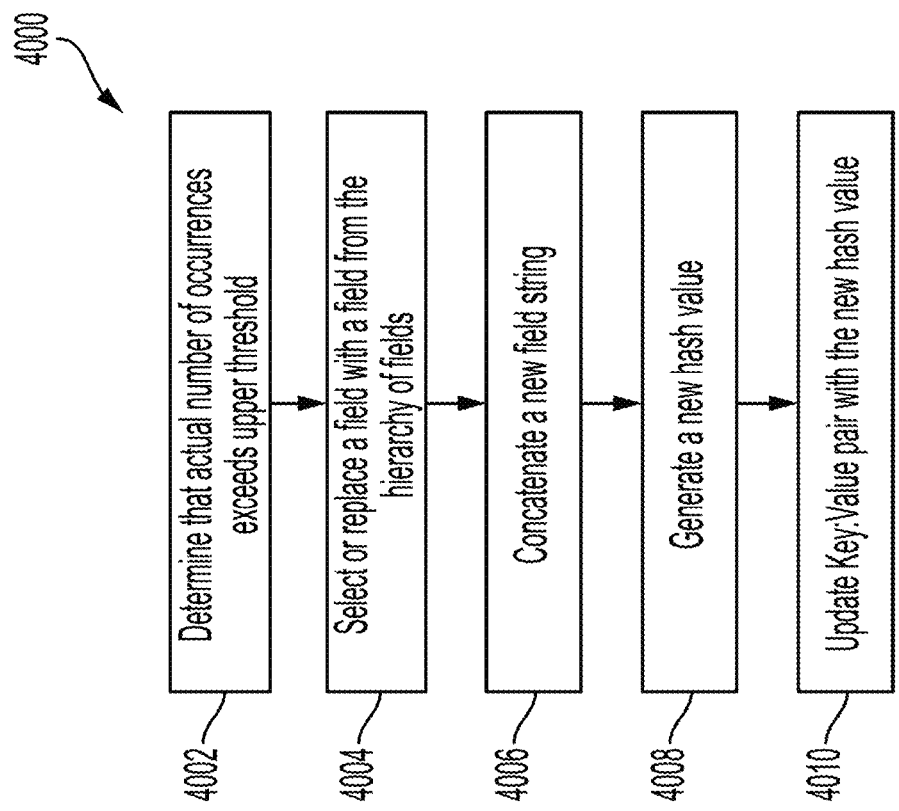
FIG. 4 illustrates a method for tuning a Key:Value pair that exceeds an upper threshold for an anticipated number of occurrences for behavior matching the Key:Value pair, in accordance with at least one aspect of the present disclosure.

FIG. 4 illustrates a method for tuning a Key:Value pair that exceeds an upper threshold for an anticipated number of occurrences for behavior matching the Key:Value pair. The server determines 4002 that the total number of observations exceeds the upper threshold, and updates the hash value by generating a new concatenated string with one or more additional fields from the hierarchy of fields. The server selects 4004 one or more least dynamic fields from the hierarchy of fields to include or replace a field for a new RowKey field string. The server concatenates 4006 a new string and generates 4008 a new hash value. The server updates 4010 the Key:Value pair with the new hash value for the security detection saved search. By adding another field or replacing a current field, the hash value is more narrowly tailored to specific behavior and is less likely to capture unintended behavior.

Figure 5:
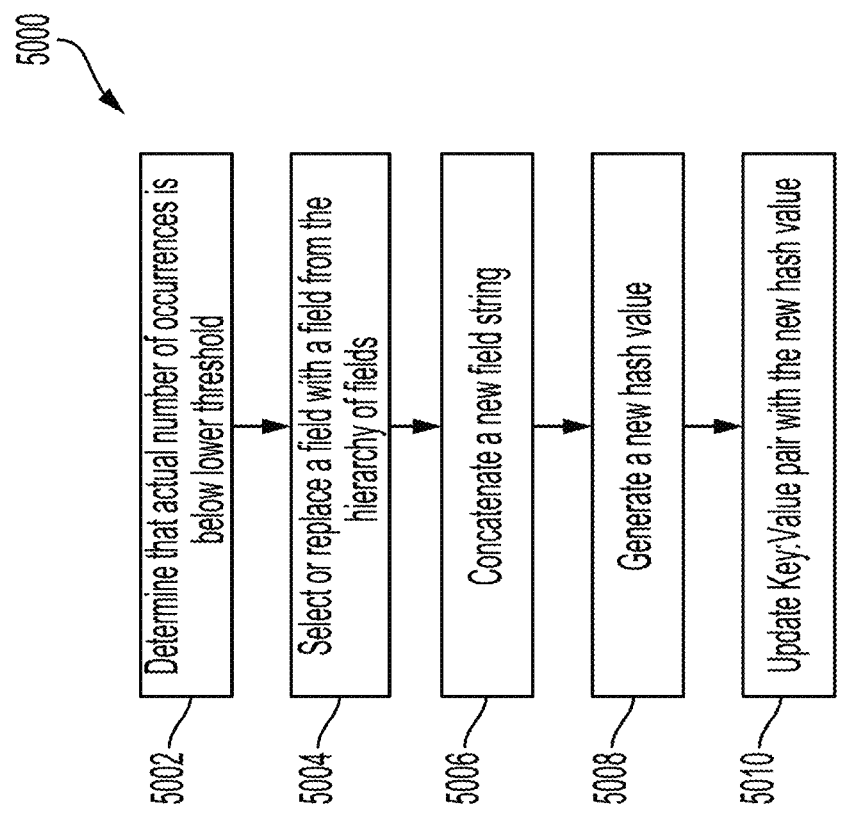
FIG. 5 illustrates a method for tuning a Key:Value pair that falls below a lower threshold for an anticipated number of occurrences for behavior matching the Key:Value pair, in accordance with at least one aspect of the present disclosure.

FIG. 5 illustrates a method for tuning a Key:Value pair that falls below a lower threshold for an anticipated number of occurrences for behavior matching the Key:Value pair. The server determines 5002 that the total number of observations is below the lower threshold, and updates the hash value by generating a new concatenated string with one or more removed fields based on the hierarchy of fields. The server selects 5004 one or more of the most dynamic fields used to concatenate the string, and removes or replaces 5006 the most dynamic field with the least dynamic field from the hierarchy of fields. The server concatenates 5008 a new string and generates 5010 a new hash value. The server updates 5012 the Key:Value pair with the new hash value for the security detection saved search. By adding another field or replacing a current field, the hash value is more narrowly tailored to specific behavior and is less likely to capture unintended behavior.

Determining Inconsistent Post-Triage Analysis Conclusion by Different Analysts

In various aspects, the system may use the Key:Value pair or hash value to track post-triage analysis performed by analysts. The post-triage analysis comprises a security conclusion about the security case. In various aspects, the analyst may determine whether the security case, associated with the Key:Value pair, is a security threat, not a security threat, or indeterminate. The analyst may further determine that a security threat is associated with a specific type of security threat such as DDOS attack, out-of-date software known for specific vulnerability, unauthorized third party access of client system, etc.

For well-established security issues stemming from an observed behavior, the system may have sufficient data from a plurality of analysts to develop an inferred conclusion. In other cases, a security vulnerability may be too new to have inferred conclusions. In cases of recently identified security vulnerability, the system may compare individual analyst conclusions to identify continuity and inconsistency between analyst conclusions. In situations where there is inconsistency between analyst conclusions, there may be insufficient information to determine which analyst has reached an incorrect conclusion. The system flags the post triage analysis and feeds subsequent occurrences to different analyst until a quorum may be reached. In other cases the system may determine that a quorum cannot be reached and the behavioral identifiers may need to be updated.

Figure 6:
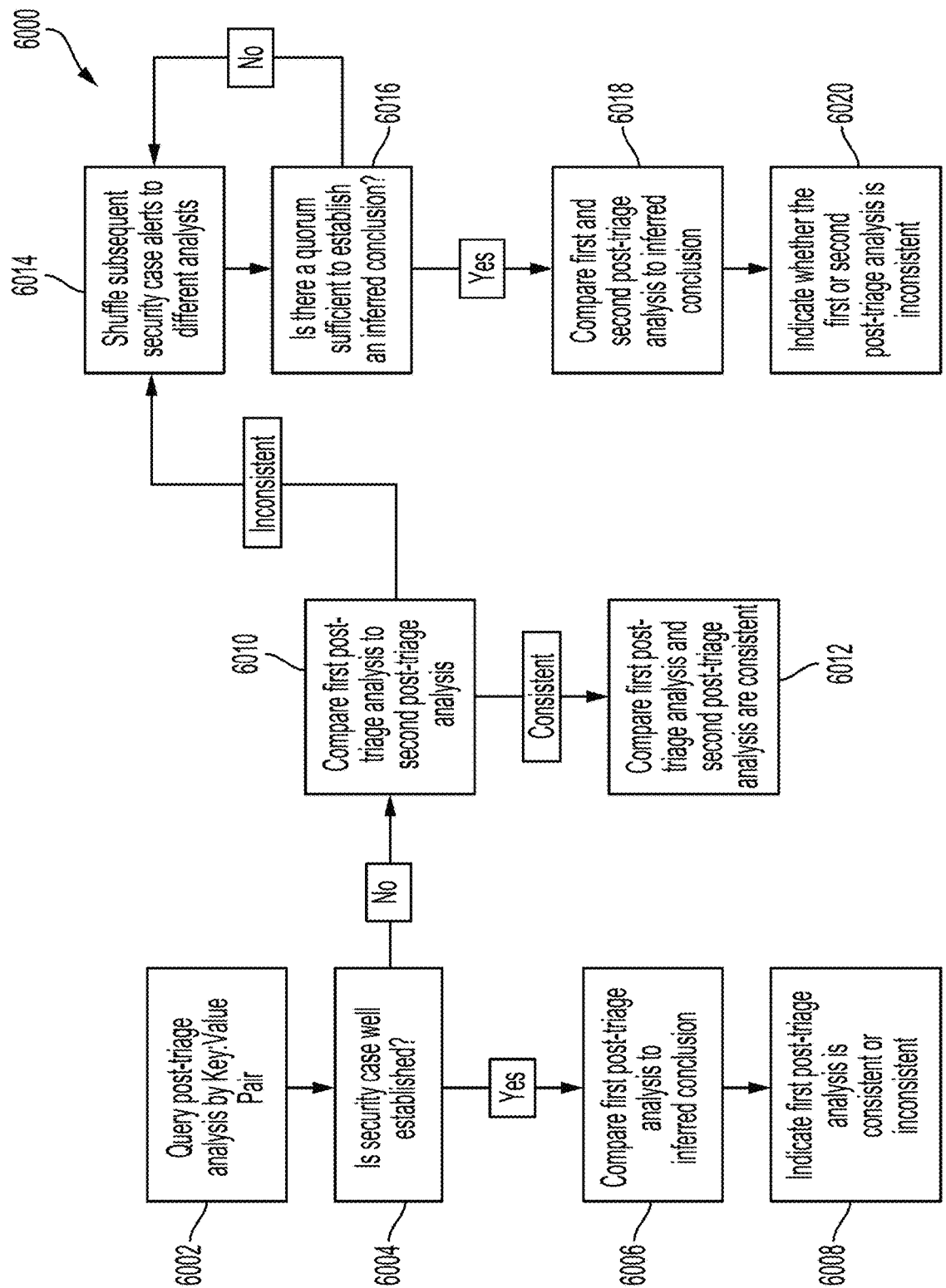
FIG. 6 illustrates a computing architecture of a security analytics server, in accordance with at least one aspect of the present disclosure.

FIG. 6 shows a flow diagram for determining abnormalities in security case analysis based on inconsistent post-triage analysis conclusion by different analysts. The server queries 6002 post-triage analysis performed by one of the plurality of analysts, based on the Key:Value pair. Each post-triage analysis corresponds to a different throttling interval because only one security case alert is sent per throttling interval. The server determines 6004 whether the Key:Value pair is associated with a new or well-established security case. Well established security cases have a predetermined number of consistent post-triage analysis conclusion.

For well-established security cases, the system may compare 6006 an analyst's post-triage analysis to an inferred conclusion based on an aggregate of consistent post-triage analysis conclusions. The server determines whether the post-triage analysis matches the inferred conclusion and indicates 6008 whether the conclusion is inconsistent.

For new security cases or cases that do not have a predetermined number of consistent post-triage analysis conclusion, the server compares 6010 the first post-triage analysis conclusion to a second post-triage analysis conclusion. The server determines whether the post-triage analysis matches the inferred conclusion and indicates 6012 whether the conclusion is consistent or inconsistent.

For Inconsistent post-triage analysis conclusions, the server shuffles 6014 a subsequent security case alert to a different analyst from the first and second post-triage analysis. The server determines 6016 whether a quorum is reached to establish an inferred conclusion, based on the subsequent security case alert. If the server determines that a quorum is reached in a predetermined number of consistent cases, the server compares 6018 the analyst's post-triage analysis to the inferred conclusion. The server determines whether the post-triage analysis matches the inferred conclusion and indicates 6020 whether the first or second conclusion is inconsistent. If the server determines that a quorum is not reached, the server shuffles 6014 a subsequent security case alert to a different analyst or until a quorum is reached.

FIG. 7 illustrates a diagram of a computing system 7000, in accordance with at least one non-limiting aspect of the present disclosure. The computing system 7000 and the various components comprised therein, as described below, may be used to implement and/or execute any of various components the systems and methods 2000, 3000, 4000, 5000, and 6000, described hereinabove in connection with FIGS. 2-6.

According to the non-limiting aspect of FIG. 7, the computer system 7000 may include a bus 7002 (i.e., interconnect), one or more processors 7004, a main memory 7006, read-only memory 7008, removable storage media 7010, mass storage 7012, and one or more communications ports 7014. As should be appreciated, components such as removable storage media are optional and are not necessary in all systems. Communication port 7014 may be connected to one or more networks by way of which the computer system 7000 may receive and/or transmit data.

As used herein, a "processor" can mean one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 7004 can be any known processor, such as, but not limited to, processors manufactured and/or sold by INTEL®, AMD®, MOTOROLA®, and the like, that are generally well-known to one skilled in the relevant art and are well-defined in the literature. Communications port(s) 7014 can be any of an RS-232 port for use with a modem based dial-up connection, a 10/100 Ethernet port, a Gigabit port using copper or fiber, or a USB port, and the like. Communications port(s) 7014 may be chosen depending on a network such as a Local Area Network (LAN), a Wide Area Network (WAN), a CDN, or any network to which the computer system 7000 connects. The computer system 7000 may be in communication with peripheral devices (e.g., display screen 7016, input device(s) 7018) via Input/Output (I/O) port 7020.

Main memory 7006 can be Random Access Memory (RAM), or any other dynamic storage device(s) commonly known in the art. Read-only memory 7008 can be any static storage device(s) such as Programmable Read-Only Memory (PROM) chips for storing static information such as instructions for processor 7004. Mass storage 7012 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 7002 communicatively couples processor(s) 7004 with the other memory, storage, and communications blocks. Bus 7002 can be a PCI/PCI-X, SCSI, a Universal Serial Bus (USB) based system bus (or other) depending on the storage devices used, and the like. Removable storage media 7010 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Aspects described herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, aspects described herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 7006 is encoded with application(s) 7022 that supports the functionality discussed herein (the application 7022 may be an application that provides some or all of the functionality of the CD services described herein, including the client application). Application(s) 7022 (and/or other resources as described herein) can be embodied as software code such as data and/or logic instructions (e.g., code stored in the memory or on another computer readable medium such as a disk) that supports processing functionality according to different aspects described herein.

During operation of one aspect, processor(s) 7004 accesses main memory 7006 via the use of bus 7002 in order to launch, run, execute, interpret or otherwise perform the logic instructions of the application(s) 7022. Execution of application(s) 7022 produces processing functionality of the service related to the application(s). In other words, the process(es) 7024 represent one or more portions of the application(s) 7022 performing within or upon the processor(s) 7004 in the computer system 7000.

It should be noted that, in addition to the process(es) 7024 that carries (carry) out operations as discussed herein, other aspects described herein include the application 7022 itself (i.e., the un-executed or non-performing logic instructions and/or data). The application 7022 may be stored on a computer readable medium (e.g., a repository) such as a disk or in an optical medium. According to other aspects, the application 7022 can also be stored in a memory type system such as in firmware, read only memory (ROM), or, as in this example, as executable code within the main memory 7006 (e.g., within Random Access Memory or RAM). For example, application 7022 may also be stored in removable storage media 7010, read-only memory 7008 and/or mass storage device 7012.

Those skilled in the art will understand that the computer system 7000 can include other processes and/or software and hardware components, such as an operating system that controls allocation and use of hardware resources.

Various aspects of the subject matter described herein are set out in the following numbered Examples:

Example 1: A method for deduplication of security case alerts based on the identification of Key:Value pair for behavioral observation data and asset identifies, the method comprising: receiving, by a processor, a dataset comprising behavioral observation data from one or more data source; executing, by the processor, a query comprising security detection saved searches, wherein the query searches the dataset of behavioral observation data for data entries that match one or more of the security detection saved searches; generating, by the processor, search results from the dataset, wherein the search results comprise matching dataset entries to the security detection saved searches, wherein each matching entry of the search results is generated as a row with a plurality of fields, and wherein the plurality of fields include at least an asset identifier; determining, by the processor, one or more dynamic fields for each security detection saved search based on the query results for the respective security detection saved search; excluding, by the processor, the one or more dynamic fields from the query; concatenating, by the processor, a search string that includes all non-excluded fields; generating, by the processor, a hash value for the concatenated search string; generating, by the processor, a first Key:Value pair with the first generated hash value that summarizes the asset behavior and the asset identifier; determining, by the processor, a predetermined throttling interval for the Key:Value Pair, wherein the throttling interval indicates the amount of time between a security case alert for the first key value pair; emitting, by the processor, a first security case alert for the first Key:Value pair and initiate a counter for the first Key:Value pair, wherein the first security case alert is the first security case emitted in the throttling interval; detecting, by the processor, a second query result matching the first Key:Value pair; determining, by the processor, that the counter is less than the throttling interval; suppressing, by the processor, a subsequent security case alert for the second query result matching the first Key:Value pair during the predetermined throttling interval; updating, by the processor, a throttling log associated with each Key:Value pair to include the total number of detected matching Key:Value pair in the throttling interval.

Example 2: The method for deduplication of security case alerts of Example 1, wherein the one or more dynamic fields comprises a timestamp field, vendor unique identifier field, or processor-generated metadata field.

Example 3: The method for deduplication of security case alerts of Examples 1-2, wherein the asset identifier comprise a source IP address, a destination IP address, and/or a network domain.

Example 4: The method for deduplication of security case alerts of Example 3, wherein the asset identifier is a network domain, and wherein the network domain is rewritten in a reverse orientation, wherein the top level domain is the first component, the network domain remains the middle component, and the world wide web indicator is the last component.

Example 5: The method for deduplication of security case alerts of Examples 1-4, wherein the security detection saved searches comprises a plurality of search criterion correlating to malicious behavior of an asset or susceptibility of an asset to malicious behavior.

Example 6: The method for deduplication of security case alerts of Examples 1-5, wherein the hash value is generated by a SHA1, SHA256, or MD5 hashing algorithm.

Example 7: The method for deduplication of security case alerts of Examples 1-6, further comprising: determining, by the processor, the total number of detected matching Key:Value pair in a completed throttling interval, wherein the counter value is greater than the throttling interval value for the completed throttling interval; comparing, by the processor, the total number of detected matching Key:Value pair to an upper and lower threshold parameter, wherein the upper threshold indicates an unusually high number of occurrences and the lower threshold indicates an unusually low number of occurrences.

Example 8: The method for deduplication of security case alerts of Example 7, further comprising: determining, by the processor, the total number of detected matching Key:Value pair exceeds the upper threshold parameter; removing, by the processor, a predetermined fields from the concentrated string; generating, by the processor, a new hash value for the first Key:Value pair; updating, by the processor, the first Key:Value pair with the new hash value.

Example 9: The method for deduplication of security case alerts of Example 7, further comprising: determining, by the processor, the total number of detected matching Key:Value pair is under the lower threshold parameter; adding, by the processor, one or more dynamic fields that were removed from the concentrated string; generating, by the processor, a new hash value for the first Key:Value pair; updating, by the processor, the first Key:Value pair with the new hash value.

Example 10: The method for deduplication of security case alerts of Examples 1-9, further comprising: querying, by the processor, a first post-triage analysis associated with the first Key:Value pair, wherein the first post-triage analysis comprises a first analyst identifier, and wherein the first analyst identifier is associated with a first analyst; querying, by the processor, an aggregate post-triage analysis associated with the first Key:Value pair and a plurality of different analyst, wherein the aggregate post-triage analysis is determined based on a predetermined number of different analysts, and wherein the predetermined number of different analysts reach the same conclusion associated with the first Key:Value pair; comparing, by the processor, the first post-triage analysis and the aggregate post-triage analysis determining, by the processor, that the first analyst and the plurality of different analyst reach different conclusions associated with the Key:Value pair; flagging, by the processor, the first post-triage analysis by the first analyst as inconsistent with the aggregate post-triage analysis.

Example 11: The method for deduplication of security case alerts of Examples 1-10, further comprising: querying, by the processor, a first post-triage analysis associated with the first Key:Value pair, wherein the first post-triage analysis comprises a first analyst identifier, and wherein the first analyst identifier is associated with a first analyst; querying, by the processor, a second post-triage analysis associated with the first Key:Value pair and a second analyst, wherein the second analyst identifier is associated with a second analyst, and wherein the second analyst identifier is different from the first analyst identifier; comparing, by the processor, the first post-triage analysis and the second post-triage analysis determining, by the processor, that the first analyst and the second analyst reach different conclusions associated with the Key:Value pair, wherein the first analyst concludes that the first Key:Value pair is associated with a security threat and the second analyst concludes that the first Key:Value pair is not associated with a security threat.

Example 12: The method for deduplication of security case alerts of Example 11, further comprising: determining, by the processor, that there is a predetermined amount of additional analyst data that is sufficient to resolve the conflict between the first analyst and second analyst; determining, by the processor, that a threshold amount of analysts reached the same conclusion; flagging, by the processor, that the first analyst or second analyst based on an inconsistency with a threshold conclusion.

Example 13: The method for deduplication of security case alerts of Example 11, further comprising: determining, by the processor, that there is a predetermined amount of additional analyst data that is insufficient to resolve the conflict between the first analyst and second analyst; shuffling, by the processor, subsequent security case alerts associated with the first Key:Value pair to analysts not associated with the first analyst identifier and second analyst identifier.

Example 14: A system for generating unique hash values representative of queryable threat event, the system comprising: a security analytics server comprising: at least one processor; at least one memory communicatively coupled to the at least one processor; an input/output interface configured for accessing data from one or more external source, each of the plurality of external sources communicatively coupled to the at least one processor; a database residing in the at least one memory and configured to store the data; and wherein the at least one memory is configured to store instructions executable by the at least one processor to: receive a dataset comprising behavioral observation data from one or more data source; execute a query comprising security detection saved searches, wherein the query searches the dataset of behavioral observation data for data entries that match one or more of the security detection saved searches; generate search results from the dataset, wherein the search results comprise matching dataset entries to the security detection saved searches, wherein each matching entry of the search results is generated as a row with a plurality of fields, and wherein the plurality of fields include at least an asset identifier; determine one or more dynamic fields for each security detection saved search based on the query results for the respective security detection saved search; exclude the one or more dynamic fields from the query; concatenate a search string that includes all non-excluded fields; generate a hash value for the concatenated search string; generate a first Key:Value pair with the first generated hash value that summarizes the asset behavior and the asset identifier; determine a predetermined throttling interval for the Key:Value Pair, wherein the throttling interval indicates the amount of time between a security case alert for the first key value pair; emit a first security case alert for the first Key:Value pair and initiate a counter for the first Key:Value pair, wherein the first security case alert is the first security case emitted in the throttling interval; detect a second query result matching the first Key:Value pair; determine that the counter is less than the throttling interval; suppress a subsequent security case alert for the second query result matching the first Key:Value pair during the predetermined throttling interval; update a throttling log associated with each Key:Value pair to include the total number of detected matching Key:Value pair in the throttling interval.

Example 15: The system of Example 14, wherein the one or more dynamic fields comprises a timestamp field, vendor unique identifier field, or processor-generated metadata field.

Example 16: The system of Examples 14-15, wherein the asset identifier comprise a source IP address, a destination IP address, and/or a network domain.

Example 17: The system of Example 16, wherein the asset identifier is a network domain, and wherein the network domain is rewritten in a reverse orientation, wherein the top level domain is the first component, the network domain remains the middle component, and the World Wide Web indicator is the last component.

Example 18: The system of Examples 14-17, wherein the security detection saved searches comprises a plurality of search criterion correlating to malicious behavior of an asset or susceptibility of an asset to malicious behavior.

Example 19: The system of Examples 14-18, wherein the hash value is generated by a SHA1, SHA256, or MD5 hashing algorithm.

Example 20: The system of Examples 14-19, where the at least one processor is further configured to: query a first post-triage analysis associated with the first Key:Value pair, wherein the first post-triage analysis comprises a first analyst identifier, and wherein the first analyst identifier is associated with a first analyst; query an aggregate post-triage analysis associated with the first Key:Value pair and a plurality of different analyst, wherein the aggregate post-triage analysis is determined based on a predetermined number of different analysts, and wherein the predetermined number of different analysts reach the same conclusion associated with the first Key:Value pair; compare the first post-triage analysis and the aggregate post-triage analysis; determine that the first analyst and the plurality of different analyst reach different conclusions associated with the Key: Value pair; and flag the first post-triage analysis by the first analyst as inconsistent with the aggregate post-triage analysis.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference, and the disclosure expressly set forth in the present application controls.

Various exemplary, and illustrative aspects have been described. The aspects described herein are understood as providing illustrative features of varying detail of various aspects of the present disclosure; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the present disclosure. Accordingly, it will be recognized by persons having ordinary skill in the art that various substitutions, modifications, or combinations of any of the exemplary aspects may be made without departing from the scope of the claimed subject matter. In addition, persons skilled in the art will recognize, or be able to ascertain using no more than routine experimentation, many equivalents to the various aspects of the present disclosure upon review of this specification. Thus, the present disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one", and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one", and indefinite articles such as "a" or "an" (e.g., "a", and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A, and B together, A, and C together, B, and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A, and B together, A, and C together, B, and C together, and/or A, B, and C together, etc.). It will be further understood by those within the art that typically a disjunctive word, and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A, and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification,", and the like means that a particular feature, structure, or characteristic described in connection with the aspect is included in at least one aspect. Thus, appearances of the phrases "in one aspect," "in an aspect," "in an exemplification,", and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example, and without limitation, top, bottom, left, right, lower, upper, front, back, and variations thereof, shall relate to the orientation of the elements shown in the accompanying drawing, and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced, and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits, and by applying ordinary rounding techniques.

Any numerical range recited herein includes all sub-ranges subsumed within the recited range. For example, a range of "1 to 100" includes all sub-ranges between (and including) the recited minimum value of 1, and the recited maximum value of 100, that is, having a minimum value equal to or greater than 1, and a maximum value equal to or less than 100. Also, all ranges recited herein are inclusive of the end points of the recited ranges. For example, a range of "1 to 100" includes the end points 1, and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification, and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material, and the existing disclosure material.

The terms "comprise" (and any form of comprise, such as "comprises", and "comprising"), "have" (and any form of have, such as "has", and "having"), "include" (and any form of include, such as "includes", and "including"), and "contain" (and any form of contain, such as "contains", and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The foregoing detailed description has set forth various forms of the devices, and/or processes via the use of block diagrams, flowcharts, and/or examples. Insofar as such block diagrams, flowcharts, and/or examples contain one or more functions, and/or operations, it will be understood by those within the art that each function, and/or operation within such block diagrams, flowcharts, and/or examples can be implemented, individually, and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry, and/or writing the code for the software, and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein, "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes, and/or devices described herein, or a microprocessor configured by a computer program which at least partially carries out processes, and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware, and/or circuitry configured to perform any of the aforementioned operations. Software may be embodied as a software package, code, instructions, instruction sets, and/or data recorded on non-transitory computer readable storage medium. Firmware may be embodied as code, instructions or instruction sets, and/or data that are hard-coded (e.g., nonvolatile) in memory devices.

As used in any aspect herein, the terms "component," "system," "module", and the like can refer to a computer-related entity, either hardware, a combination of hardware, and software, software, or software in execution.

As used in any aspect herein, an "algorithm" refers to a self-consistent sequence of steps leading to a desired result, where a "step" refers to a manipulation of physical quantities, and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These, and similar terms may be associated with the appropriate physical quantities, and are merely convenient labels applied to these quantities, and/or states.

What is claimed is:

1. A method for deduplication of security case alerts based on an identification of a plurality of Key: Value pairs for behavioral observation data and asset identifies, the method comprising:
   receiving, by a processor, a dataset comprising behavioral observation data from one or more data source;
   executing, by the processor, a query comprising security detection saved searches, wherein the query searches the dataset of behavioral observation data for data entries that match the security detection saved searches;
   generating, by the processor, search results from the dataset, wherein the search results comprise matching dataset entries to the security detection saved searches, wherein each matching entry of the search results is generated as a row with a plurality of fields, and wherein the plurality of fields include at least an asset identifier;
   determining, by the processor, one or more dynamic fields for each of the security detection saved searches based on the search results for each of the security detection saved searches respectively;
   excluding, by the processor, the one or more dynamic fields from the query;
   concatenating, by the processor, a search string that includes all non-excluded fields to create a concatenated search string;
   generating, by the processor, a hash value for the concatenated search string;
   generating, by the processor, a first Key: Value pair with the hash value that summarizes an asset behavior and the asset identifier;
   determining, by the processor, a throttling interval for the Key: Value Pair, wherein the throttling interval indicates an amount of time between a security case alert for the first Key: Value pair;
   emitting, by the processor, a first security case alert for the first Key: Value pair and initiate a counter for the first Key: Value pair, wherein the first security case alert is the first security case emitted in the throttling interval;
   detecting, by the processor, a second query result matching the first Key: Value pair;
   determining, by the processor, that the counter is less than the throttling interval;
   suppressing, by the processor, a subsequent security case alert for the second query result matching the first Key: Value pair during the throttling interval; and
   updating, by the processor, a throttling log associated with each of the plurality of Key: Value pairs, wherein the throttling log includes a total number of matching Key: Value pairs in the throttling interval.

2. The method for deduplication of security case alerts of claim 1, wherein the one or more dynamic fields comprises a timestamp field, vendor unique identifier field, or processor-generated metadata field.

3. The method for deduplication of security case alerts of claim 1, wherein the asset identifier comprise a source IP address, a destination IP address, and/or a network domain.

4. The method for deduplication of security case alerts of claim 3, wherein the asset identifier is the network domain, and wherein the network domain is rewritten in a reverse orientation, wherein a top level domain is a first component, the network domain remains a middle component, and a world wide web indicator is a last component.

5. The method for deduplication of security case alerts of claim 1, wherein the security detection saved searches comprises a plurality of search criterion correlating to malicious behavior of an asset or susceptibility of an asset to malicious behavior.

6. The method for deduplication of security case alerts of claim 1, wherein the hash value is generated by a SHA1, SHA256, or MD5 hashing algorithm.

7. The method for deduplication of security case alerts of claim 1, further comprising:
   determining, by the processor, the total number of matching Key: Value pairs in a completed throttling interval, wherein the counter is greater than the throttling interval for the completed throttling interval; and
   comparing, by the processor, the total number of matching Key: Value pairs to an upper threshold and a lower threshold, wherein the upper threshold indicates an unusually high number of occurrences and the lower threshold indicates an unusually low number of occurrences.

8. The method for deduplication of security case alerts of claim 7, further comprising:
   determining, by the processor, the total number of matching Key: Value pairs exceeds the upper threshold;
   removing, by the processor, a predetermined fields from the concatenated search string;

generating, by the processor, a new hash value for the first Key: Value pair; and updating, by the processor, the first Key: Value pair with the new hash value.

9. The method for deduplication of security case alerts of claim 7, further comprising:

determining, by the processor, the total number of matching Key: Value pairs is under the lower threshold;

adding, by the processor, one or more dynamic fields that were removed from the concatenated search string;

generating, by the processor, a new hash value for the first Key: Value pair; and updating, by the processor, the first Key: Value pair with the new hash value.

10. The method for deduplication of security case alerts of claim 1, further comprising:

querying, by the processor, a first post-triage analysis associated with the first Key: Value pair, wherein the first post-triage analysis comprises a first analyst identifier, and wherein the first analyst identifier is associated with a first analyst;

querying, by the processor, an aggregate post-triage analysis associated with the first Key: Value pair and a plurality of different analyst, wherein the aggregate post-triage analysis is determined based on a predetermined number of different analysts, and wherein the predetermined number of different analysts reach the same conclusion associated with the first Key: Value pair;

comparing, by the processor, the first post-triage analysis and the aggregate post-triage analysis determining, by the processor, that the first analyst and the plurality of different analyst reach different conclusions associated with the Key: Value pair; and flagging, by the processor, the first post-triage analysis by the first analyst as inconsistent with the aggregate post-triage analysis.

11. The method for deduplication of security case alerts of claim 1, further comprising:

querying, by the processor, a first post-triage analysis associated with the first Key: Value pair, wherein the first post-triage analysis comprises a first analyst identifier, and wherein the first analyst identifier is associated with a first analyst;

querying, by the processor, a second post-triage analysis associated with the first Key: Value pair and a second analyst identifier, wherein the second analyst identifier is associated with a second analyst, and wherein the second analyst identifier is different from the first analyst identifier;

comparing, by the processor, the first post-triage analysis and the second post-triage analysis; and determining, by the processor, that the first analyst and the second analyst reach different conclusions associated with the Key: Value pair, wherein the first analyst concludes that the first Key: Value pair is associated with a security threat and the second analyst concludes that the first Key: Value pair is not associated with a security threat.

12. The method for deduplication of security case alerts of claim 11, further comprising:

determining, by the processor, that there is a predetermined amount of additional analyst data to resolve a conflict between the first analyst and second analyst;

determining, by the processor, that a threshold amount of analysts reached the same conclusion; and flagging, by the processor, that the first analyst or second analyst based on an inconsistency with a threshold conclusion.

13. The method for deduplication of security case alerts of claim 11, further comprising:

determining, by the processor, that there is a predetermined amount of additional analyst data that is insufficient to resolve a conflict between the first analyst and second analyst; and shuffling, by the processor, subsequent security case alerts associated with the first Key: Value pair to analysts not associated with the first analyst identifier and second analyst identifier.

14. A system for generating unique hash values representative of a queryable threat event, the system comprising:

a security analytics server comprising: at least one processor; at least one memory communicatively coupled to the at least one processor; an input/output interface configured for accessing data from one or more external sources, each of the one or more external sources communicatively coupled to the at least one processor; a database residing in the at least one memory and configured to store the data; and wherein the at least one memory is configured to store instructions executable by the at least one processor to: receive a dataset comprising behavioral observation data from the one or more external sources; execute a query comprising security detection saved searches, wherein the query searches the dataset of behavioral observation data for data entries that match the security detection saved searches; generate search results from the dataset, wherein the search results comprise matching dataset entries to the security detection saved searches, wherein each matching entry of the search results is generated as a row with a plurality of fields, and wherein the plurality of fields include at least an asset identifier; determine one or more dynamic fields for each of the security detection saved searches based on the search results for each of the security detection saved searches respectively; exclude the one or more dynamic fields from the query; concatenate a search string that includes all non-excluded fields to create a concatenated search string; generate a hash value for the concatenated search string; generate a first Key: Value pair of a plurality of Key: Value pairs with the hash value that summarizes an asset behavior and the asset identifier; determine a throttling interval for the Key: Value Pair, wherein the throttling interval indicates an amount of time between a security case alert for the first Key: Value pair; emit a first security case alert for the first Key: Value pair and initiate a counter for the first Key: Value pair, wherein the first security case alert is the first security case emitted in the throttling interval; detect a second query result matching the first Key: Value pair; determine that the counter is less than the throttling interval; suppress a subsequent security case alert for the second query result matching the first Key: Value pair during the throttling interval; and update a throttling log associated with each of the plurality of Key: Value pairs, wherein the throttling log includes a total number of matching Key: Value pairs in the throttling interval.

15. The system of claim 14, wherein the one or more dynamic fields comprises a timestamp field, vendor unique identifier field, or processor-generated metadata field.

16. The system of claim 14, wherein the asset identifier comprise a source IP address, a destination IP address, and/or a network domain.

17. The system of claim 16, wherein the asset identifier is the network domain, and wherein the network domain is rewritten in a reverse orientation, wherein a top level domain is a first component, the network domain remains a middle component, and a world wide web indicator is a last component.

18. The system of claim 14, wherein the security detection saved searches comprises a plurality of search criterion correlating to malicious behavior of an asset or susceptibility of an asset to malicious behavior.

19. The system of claim 14, wherein the hash value is generated by a SHA1, SHA256, or MD5 hashing algorithm.

20. The system of claim 14, where the at least one processor is further configured to:
query a first post-triage analysis associated with the first Key: Value pair, wherein the first post-triage analysis comprises a first analyst identifier, and wherein the first analyst identifier is associated with a first analyst;
query an aggregate post-triage analysis associated with the first Key: Value pair and a plurality of different analyst, wherein the aggregate post-triage analysis is determined based on a predetermined number of different analysts, and wherein the predetermined number of different analysts reach the same conclusion associated with the first Key: Value pair;
compare the first post-triage analysis and the aggregate post-triage analysis;
determine that the first analyst and the plurality of different analyst reach different conclusions associated with the Key: Value pair; and
flag the first post-triage analysis by the first analyst as inconsistent with the aggregate post-triage analysis.

* * * * *